(12) United States Patent
Li et al.

(10) Patent No.: US 11,295,245 B2
(45) Date of Patent: Apr. 5, 2022

(54) METHOD AND SYSTEM FOR ECOLOGICAL OPERATION OF TOTAL PHOSPHORUS EXPORT OF CASCADE HYDROPOWER STATION

(71) Applicant: DALIAN UNIVERSITY OF TECHNOLOGY, Dalian (CN)

(72) Inventors: Yu Li, Dalian (CN); Jiahui Deng, Dalian (CN); Bo Xu, Dalian (CN); Wei Ding, Dalian (CN); Huicheng Zhou, Dalian (CN); Chi Zhang, Dalian (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 211 days.

(21) Appl. No.: 16/860,443

(22) Filed: Apr. 28, 2020

(65) Prior Publication Data
US 2021/0201220 A1 Jul. 1, 2021

(51) Int. Cl.
*E02B 9/00* (2006.01)
*G06Q 50/06* (2012.01)
*G06Q 10/04* (2012.01)
*G06Q 10/06* (2012.01)

(52) U.S. Cl.
CPC ............... *G06Q 10/04* (2013.01); *E02B 9/00* (2013.01); *G06Q 10/06312* (2013.01); *G06Q 50/06* (2013.01)

(58) Field of Classification Search
CPC .... E02B 9/00; G06Q 10/04; G06Q 10/06312; G06Q 50/06
See application file for complete search history.

(56) References Cited

U.S. PATENT DOCUMENTS

2021/0064798 A1* 3/2021 Hu ............... G06Q 10/067

FOREIGN PATENT DOCUMENTS

| CN | 104213534 A | * | 12/2014 |
| CN | 105223937 A | * | 1/2016 |
| CN | 106373030 A | * | 2/2017 |

* cited by examiner

*Primary Examiner* — Benjamin F Fiorello
*Assistant Examiner* — Stacy N Lawson
(74) *Attorney, Agent, or Firm* — Hoffmann & Baron, LLP

(57) ABSTRACT

A method and system for ecological operation of total phosphorus (TP) export of a cascade hydropower station are provided. The method includes: integrating total power generation and TP export of the cascade hydropower station into a single operation objective, and obtaining an operation objective under different weight ratios; optimizing the obtained operation objective; and obtaining a water level operation process corresponding to total power generation and TP export under the current operation objective through the optimized operation objective. The present invention alleviates an ecological and environmental problem caused by the construction of the hydropower station from a water quality mechanism, and can be widely used, for example, in the ecological optimal operation of cascade hydropower stations in a river basin.

7 Claims, 3 Drawing Sheets

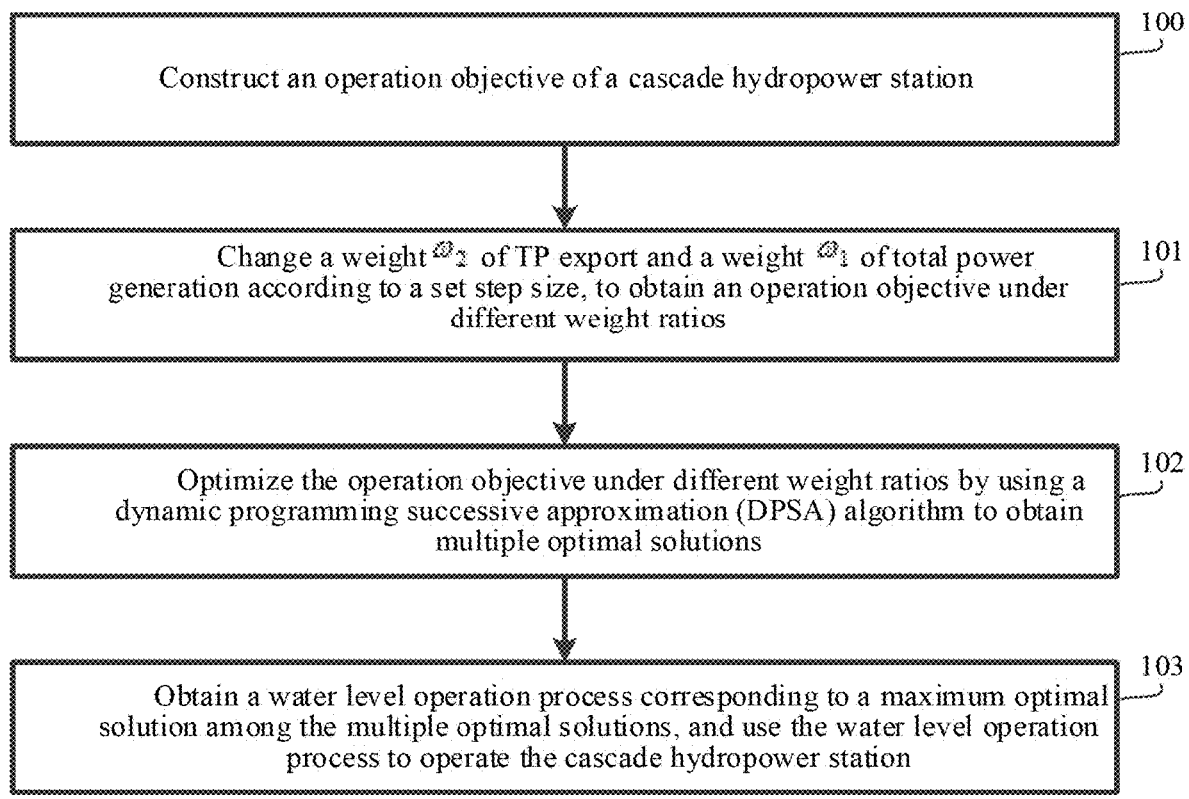
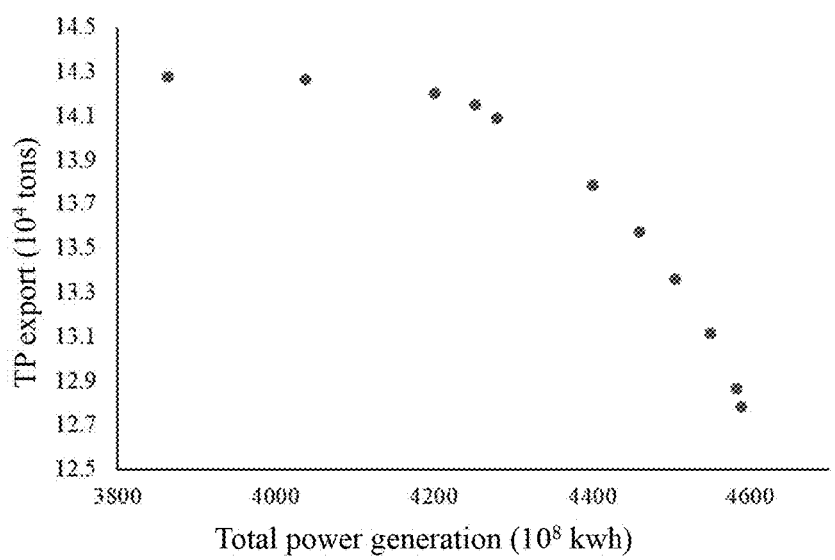

METHOD AND SYSTEM FOR ECOLOGICAL
OPERATION OF TOTAL PHOSPHORUS
EXPORT OF CASCADE HYDROPOWER
STATION

CROSS-REFERENCE TO RELATED
APPLICATIONS

This application claims priority to Chinese Patent Application No. 201911365764.X, filed on Dec. 26, 2019, the disclosure of which is incorporated by reference herein in its entirety for all purposes.

TECHNICAL FIELD

The present invention relates to the field of ecological optimal operation of hydropower stations, and in particular, to a method and system for ecological operation of total phosphorus (TP) export of a cascade hydropower station.

BACKGROUND

After a long evolution under natural conditions, the river ecosystem has formed a good adaptability to the natural runoff process. However, in recent decades, a large number of cascade hydropower stations have been constructed, and the power generation operation has significantly changed the natural hydrological regime in the rivers and brought a series of ecological and environmental problems. Therefore, it is urgent to choose an appropriate method for rational ecological optimal operation.

In traditional ecological optimal operation of hydropower stations, environmental benefits are generally taken as a constraint, for example, the minimum ecological flow constraint. This method is very simple. It cannot effectively evaluate the ecological benefits of rivers, and cannot meet the current needs for the development, management and utilization of water resources, as well as the protection and management of the water environment. To solve this situation, it is urgent to evaluate and quantify the ecological and environmental benefits of rivers.

At present, scholars have tried to choose appropriate indicators to quantify the ecological and environmental benefits of rivers or optimize them as objectives. In 1996, Richter et al. proposed a set of indicators of hydrological alteration (IHA). The IHA hydrological indicators represent river discharge and ecological changes and are most widely used. However, they cannot fully quantify the ecological and environmental benefits in the modeling. There are too many indicators, and it is difficult to reflect all of them in the modeling. When environmental benefits are taken as an objective, most studies can only subjectively choose some of the representative indicators for modeling. The indicators are derived from long series of statistical data, which are not suitable for short- and medium-term optimal operation. The indicator set focuses on statistical indicators related to the flow or the rise and fall rate, but does not involve indicators related to water quality and biogenic substances in the water body (such as total nitrogen, total phosphorus concentration, sedimentation and discharge). Changes of the content of nitrogen, phosphorus and other biogenic substances in the water body have a significant effect on the water environment quality. Therefore, these indicators should be taken as important indicators to evaluate the ecological and environmental benefits of rivers. Hydropower stations have a retention effect on biogenic substances. If the upstream biogenic substances are over retained, the downstream demand for biogenic substances cannot be met. Take phosphorus as an example, phosphorus is a controlling nutrient element of aquatic ecosystems. The hydropower stations constructed on the upper reaches of the Lancang River in China partially retain phosphorus which is necessary for fisheries and aquatic life in downstream Southeast Asian countries. This has led to an increase in phosphorus content in the upstream reservoir area, increasing the risk of eutrophication, and negatively impacted both the downstream economy and the environment. This is one of the reasons why the construction of the hydropower stations on the Lancang River is often criticized by downstream countries.

SUMMARY

In order to solve the urgent technical problems in the art, embodiments of the present invention provide a method and system for ecological optimal operation of a hydropower station based on a total phosphorus (TP) export objective. An embodiment of the present invention proposes for the first time to take TP export as an ecological operation objective to optimize a water level operation process of a cascade hydropower station. The present invention effectively improves the water environment quality in a reservoir area of the cascade hydropower station.

To achieve the above purpose, the present invention provides the following technical solutions.

A method for ecological operation of TP export of a cascade hydropower station includes:

constructing an operation objective of the cascade hydropower station, the operation objective being: $D=\omega_1 \cdot W + \omega_2 \cdot TP$, where TP is a TP export of the cascade hydropower station, max $TP=\sum_{t=1}^{T} QR_{k,t} \cdot c_{k,t} \cdot \Delta t$; W is total power generation of the cascade hydropower station, max $W=\sum_{t=1}^{T}\sum_{j=1}^{k} P_{j,t} \cdot \Delta t$; T is a total number of time periods in an operation period; k is a serial number of a last stage of hydropower station in the cascade hydropower station; $\Delta t$ is a time step; j is a serial number of a hydropower station in the cascade hydropower station from upstream to downstream; $QR_{k,t}$ is a release flow of the hydropower station k in a time period t; $c_{k,t}$ is an average phosphorus concentration of the hydropower station k in the time period t, $$c_{k,t} = \frac{M_t + M_{t+1}}{2V_t};$$

$L_t$ is a phosphorus load in the time period t; $\sigma$ is a deposition coefficient; $QR_t$ is an average release capacity in the time period t; $V_t$ is an average storage capacity of the hydropower station k in the time period t; $M_t$ is the total mass of phosphorus in a water body of a reservoir area at a time t; $P_{j,t}$ is an average output of the power station j in the time period t; t is a serial number of a time period; $\omega_1$ is a weight of the total power generation; $\omega_2$ is a weight of the TP export, $\omega_1 \in [1, 0]$, $\omega_2 \in [0, 1]$ and $\omega_1 + \omega_2 = 1$;

changing the weight $\omega_2$ of the TP export and the weight $\omega_1$ of the total power generation according to a set step size, to obtain an operation objective under different weight ratios;

optimizing the operation objective under different weight ratios by using a dynamic programming successive approximation (DPSA) algorithm to obtain multiple optimal solutions; and obtaining a water level operation process corresponding to a maximum optimal solution among the multiple optimal solutions, and using the water level operation process to operate the cascade hydropower station.

Optionally, the set step size is 0.1.

Optionally, the optimizing the operation objective under different weight ratios by using a DPSA algorithm to obtain multiple optimal solutions includes:

optimizing a water level of each stage of hydropower station in the cascade hydropower station at different times by using the water level of each stage of hydropower station at different times as a decision variable;

obtaining TP export and total power generation corresponding to an optimized water level in different time periods, based on an optimized water level at different times; and obtaining multiple optimal solutions of the operation objective under different weight ratios according to the TP export and the total power generation corresponding to the optimized water level in different time periods.

Optionally, the optimizing the operation objective under different weight ratios by using a DPSA algorithm to obtain multiple optimal solutions further includes:

obtaining a constraint condition for the water level to serve as a decision variable, the constraint condition including a water balance constraint, a storage capacity constraint, an output constraint and a release flow constraint.

A system for ecological operation of TP export of a cascade hydropower station includes:

an operation objective construction module, configured to construct an operation objective of the cascade hydropower station, the operation objective being: $D=\omega_1 \cdot W + \omega_2 \cdot TP$, where TP is a TP export of the cascade hydropower station, max $TP=\sum_{t=1}^{T} QR_{k,t} \cdot c_{k,t} \cdot \Delta t$; W is total power generation of the cascade hydropower station, max $W=\sum_{t=1}^{T} \sum_{j=1}^{k} P_{j,t} \cdot \Delta t$; T is a total number of time periods in an operation period; k is a serial number of a last stage of hydropower station in the cascade hydropower station; $\Delta t$ is a time step; j is a serial number of a hydropower station in the cascade hydropower station from upstream to downstream; $QR_{k,t}$ is a release flow of the hydropower station k in a time period t; $c_{k,t}$ is an average phosphorus concentration of the hydropower station k in the time period t, $$c_{k,t} = \frac{M_t + M_{t+1}}{2V_t};$$

$L_t$ is a phosphorus load in the time period t; $\sigma$ is a deposition coefficient; $QR_t$ is an average release capacity in the time period t; $V_t$ is an average storage capacity of the hydropower station k in the time period t; $M_t$ is the total mass of phosphorus in a water body of a reservoir area at a time t; $P_{j,t}$ is an average output of the power station j in the time period t; t is a serial number of a time period; $\omega_1$ is a weight of the total power generation; $\omega_2$ is a weight of the TP export, $\omega_1 \in [1, 0]$, $\omega_2 \in [0, 1]$ and $\omega_1 + \omega_2 = 1$;

an optimized operation objective obtaining module, configured to change the weight $\omega_2$ of the TP export and the weight $\omega_1$ of the total power generation according to a set step size, to obtain an operation objective under different weight ratios;

an optimal solution obtaining module, configured to optimize the operation objective under different weight ratios by using a DPSA algorithm to obtain multiple optimal solutions; and a water level operation process obtaining module, configured to obtain a water level operation process corresponding to a maximum optimal solution among the multiple optimal solutions, and use the water level operation process to operate the cascade hydropower station.

Optionally, the optimal solution obtaining module includes:

a water level optimization unit, configured to optimize a water level of each stage of hydropower station in the cascade hydropower station at different times by using the water level of each stage of hydropower station at different times as a decision variable;

a TP export and total power generation obtaining unit, configured to obtain TP export and total power generation corresponding to an optimized water level in different time periods, based on an optimized water level at different times; and an optimal solution obtaining unit, configured to obtain multiple optimal solutions of the operation objective under different weight ratios according to the TP export and the total power generation corresponding to the optimized water level in different time periods.

Optionally, the optimal solution obtaining module further includes:

a constraint condition obtaining unit, configured to obtain a constraint condition for the water level to serve as a decision variable, the constraint condition including a water balance constraint, a storage capacity constraint, an output constraint and a release flow constraint.

According to specific embodiments provided by the present invention, the present invention discloses the following technical effects. The present invention provides a method and system for ecological operation of TP export of a cascade hydropower station. The method includes: integrating total power generation and TP export of the cascade hydropower station into a single operation objective, and obtaining an operation objective under different weight ratios; optimizing the obtained operation objective; and obtaining a water level operation process corresponding to total power generation and TP export under the current operation objective through the optimized operation objective. The present invention alleviates an ecological and environmental problem caused by the construction of the hydropower station from a water quality mechanism, and can be widely used to the ecological optimal operation of cascade hydropower stations in a river basin.

BRIEF DESCRIPTION OF DRAWINGS

To describe the technical solutions in the embodiments of the present invention or in the prior art more clearly, the following briefly describes the accompanying drawings required for the embodiments. Apparently, the accompanying drawings in the following description show merely some embodiments of the present invention, and a person of ordinary skill in the art may still derive other accompanying drawings from these accompanying drawings without creative efforts.

FIG. 1 is a flowchart of a method for ecological operation of TP export of a cascade hydropower station provided by an embodiment of the present invention.

FIG. 2 is a Pareto front solution set of generation capacity and TP export according to an embodiment of the present invention.

DETAILED DESCRIPTION

Figure 3A:
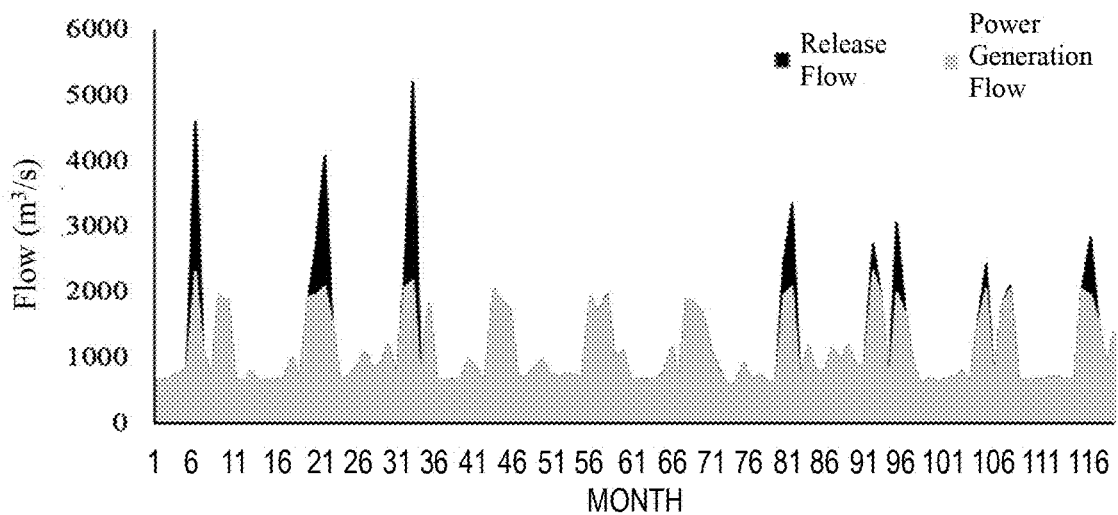
FIG. 3a shows a release process and a composition of release flow of Xiaowan Hydropower Station according to an embodiment of the present invention.

The following clearly and completely describes the technical solutions in the embodiments of the present invention with reference to accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

An objective of the present invention is to provide a method and system for ecological operation of TP export of a cascade hydropower station. The present invention proposes for the first time to take TP export as an ecological operation objective to optimize a water level operation process of a cascade hydropower station. The present invention effectively improves the water environment quality in a reservoir area of the cascade hydropower station.

To make the above objects, features, and advantages of the present invention more obvious and easy to understand, the present invention will be further described in detail with reference to the accompanying drawings and the detailed description.

FIG. 1 is a flowchart of a method for ecological operation of TP export of a cascade hydropower station provided by an embodiment of the present invention. As shown in FIG. 1, the method for ecological operation of TP export of a cascade hydropower station includes:

S100, construct an operation objective of the cascade hydropower station, the operation objective being: $D=\omega_1 \cdot W + \omega_2 \cdot TP$, where TP is a TP export of the cascade hydropower station, max $TP = \sum_{t=1}^{T} QR_{k,t} \cdot c_{k,t} \cdot \Delta t$; W is total power generation of the cascade hydropower station, max $W = \sum_{t=1}^{T} \sum_{j=1}^{k} P_{j,t} \cdot \Delta t$; T is a total number of time periods in an operation period; k is a serial number of a last stage of hydropower station in the cascade hydropower station; $\Delta t$ is a time step; j is a serial number of a hydropower station in the cascade hydropower station from upstream to downstream; $QR_{k,t}$ is a release flow of the hydropower station k in a time period t; $c_{k,t}$ is an average phosphorus concentration of the hydropower station k in the time period t, $$c_{k,t} = \frac{M_t + M_{t+1}}{2V_t};$$

$L_t$ is a phosphorus load in the time period t; $\sigma$ is a deposition coefficient; $QR_t$ is an average release capacity in the time period t; $V_t$ is an average storage capacity of the hydropower station k in the time period t; $M_t$ is the total mass of phosphorus in a water body of a reservoir area at a time t; $P_{j,t}$ is an average output of the power station j in the time period t; t is a serial number of a time period; $\omega_1$ is a weight of the total power generation; $\omega_2$ is a weight of the TP export, $\omega_1 \in [1, 0]$, $\omega_2 \in [0, 1]$ and $\omega_1 + \omega_2 = 1$;

S101, change the weight $\omega_2$ of the TP export and the weight $\omega_1$ of the total power generation according to a set step size, to obtain an operation objective under different weight ratios;

S102, optimize the operation objective under different weight ratios by using a dynamic programming successive approximation (DPSA) algorithm to obtain multiple optimal solutions; and S103, obtain a water level operation process corresponding to a maximum optimal solution among the multiple optimal solutions, and use the water level operation process to operate the cascade hydropower station.

Before S100, the operation method provided by the present invention further includes:

obtain various parameters of the cascade power station, including water level-storage capacity curve, water head-water consumption rate curve, installed capacity, guaranteed output, unit maximum discharge capacity constraint, maximum/minimum release flow constraint and phosphorus deposition coefficient, etc.; and establish an optimal operation model for the cascade power station with maximum generation capacity and maximum TP export as double objectives, where the TP export serves as an ecological objective The established optimal operation model includes an objective function. The objective function includes:

$$\max TP = \sum_{t=1}^{T} QR_{k,t} \cdot c_{k,t} \cdot \Delta t,$$

$$\max W = \sum_{t=1}^{T} \sum_{j=1}^{k} P_{j,t} \cdot \Delta t.$$

In S100, a variable-weight method is adopted to transform double objectives into a single objective to deal with a multi-objective problem, and a weighted sum of the total power generation and the TP export is used as an operation objective for direct optimization, that is, the operation objective is calculated according to the formula $D = \omega_1 \cdot W + \omega_2 \cdot TP$.

In S100, as a first objective, the TP export is a sum of a product of the release capacity and the phosphorus concentration in different time periods. An average phosphorus concentration $c_{k,t}$ of each power station in each time period is obtained by recursive simulation by using a mass balance model. The mass balance model is expressed as $$\frac{dM_t}{dt} = M_{t+1} - M_t = L_t - \sigma M_t - \frac{QR_t}{V_t} M_t.$$

Given the phosphorus load $L_t$ and release flow $QR_t$ in each time period, the total phosphorus $M_t$ and the average storage capacity $V_t$ in all time periods are obtained through the recursive calculation of the mass balance model, that is, $c_{k,t}$ is equal to $$\frac{M_t + M_{t+1}}{2V_t}$$

or a corresponding hydropower station at a corresponding time.

In S101, the weights of the two objectives are changed from [1:0] to [0:1] with a step size of 0.1 to finally obtain an operation objective D under 11 weight ratios. The operation objective D under each of the 11 weight ratios is optimized to obtain 11 objective values of total power generation W and TP export TP.

The DPSA algorithm is one of the effective methods to solve a multi-dimensional problem. By using this algorithm, the present invention optimizes a water level of each power station at each time (i.e. a decision variable in a model) by optimizing a water level of all reservoirs based on the operation objective D.

In S102, the present invention uses the DPSA algorithm to optimize a water level operation process of the cascade power station based on the operation objective under different weight ratios by means of "simulation-optimization." The present invention obtains a Pareto front solution set of total power generation and TP export (which is a competitive relationship between the total power generation and maximum TP export) and an operation process of each solution (as shown in FIG. 2). Specifically:

optimize by using the water level of all reservoirs in one of the time periods as a variable and assuming the rest to be fixed, where the use of the DPSA algorithm to optimize the water level of each power station has particularity, and the specific optimization process is:

keep the water level of all hydropower stations in other time periods fixed; take a number of discrete points above and below the water level of each hydropower station in the current time period with a certain step size to obtain a discrete combination of water levels of all hydropower stations in the current time period; combine any of the combinations and all other fixed points to form a new water level process; simulate based on the new water level process, and calculate objective function values TP and W and the operation objective D; take a water level corresponding to maximum D as an optimized water level at the current time;

optimize a water level in the next time period based on the above optimization process, and sequentially obtain an optimal solution of a water level in all other time periods;

reduce the discrete step size of the current water level process to perform iterative optimization again; repeat the above process, and end the iteration until a discrete accuracy is less than a certain accuracy; and repeat the above process by using the same method; input an optimization result of the previous cycle to successively iterate and optimize the water level process for multiple cycles; end the entire iterative process when a relative error of two (previous and next) operation objective values meets a certain accuracy. In an optimization result, W and TP corresponding to a maximum operation objective D constitute a Pareto front solution. Each Pareto front solution corresponds to an operation process which is ecologically optimal (or achieves the largest TP export of the cascade power station) under the generation capacity of the Pareto solution. The Pareto front solution can be used to guide the ecological operation of the hydropower station.

The decision variable in the model is the water level of each stage of power station in the cascade power station at each time. A constraint condition of the decision variable includes a water balance constraint, a storage capacity constraint, an output constraint and a release flow constraint.

The water balance constraint is:

$S_{j,t+1}=S_{j,t}+(QI_{j,t}-QR_{j,t})\cdot \Delta t$, where $QI_{j,t}=QR_{j-1,t}+q_{j,t}$; $QR_{j,t}=QG_{j,t}+QS_{j,t}$ and $QR_{j,t},QG_{j,t},QS_{j,t},S_{j,t}$ are both greater than or equal to 0; $S_{j,t}$ is a storage capacity of a reservoir j at a time t; $QI_{j,t}$ is total inflow of the reservoir j at the time t; $QR_{j,t}$ is a release flow of the reservoir j at the time t; $\Delta t$ is a time step; $q_{j,t}$ is interval confluence of reservoirs j and j−1; $QG_{j,t}$ is a generation flow of the reservoir j at the time t; $QS_{j,t}$ is a non-generation flow of the reservoir j at the time t.

The storage capacity constraint is:
$S_j^{min} \leq S_{j,t} \leq S_{j,t}^{max}$, where, $S_j^{min}$ is a dead water level of the reservoir j, and $S_{j,t}^{max}$ is a maximum water level of the reservoir j at the time t.

The output constraint is:

$0 \leq P_{j,t} \leq IC_j$;

$P_j^{min} \leq P_{j,t}$; where $P_{j,t}$ is an output of the reservoir j at the time t, $IC_j$ is an installed capacity of the reservoir j, and $P_j^{min}$ is a minimum output constraint of the reservoir j.

The flow constraint is:

$QR_j^{min} \leq QR_{j,t} \leq QR_j^{max}$;

$QR_j^{min} \leq QG_{j,t} \leq MIN(QG_j^{max},QG_{j,t}^{IC})$; where $QR_j^{min}$ and $QG_j^{max}$ are minimum release flow and maximum release flow of the reservoir j, respectively, and $QG_{j,t}^{IC}$ is a flow required for the installed capacity of the reservoir j at the time t.

Figure 3B:
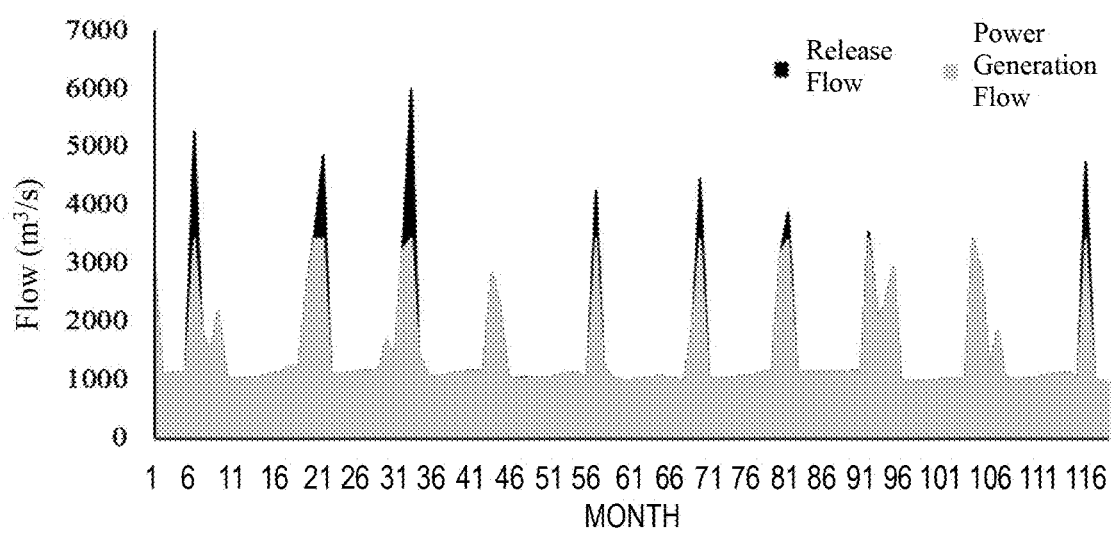
FIG. 3b shows a release process and a composition of release flow of Nuozhadu Hydropower Station according to an embodiment of the present invention.

The operation method provided by the present invention is used to optimize the operation of Xiaowan-Nuozhadu cascade hydropower station on the Lancang River in China. A release process and a composition of release flow of the cascade hydropower station are shown in FIG. 3a and FIG. 3b.

An operation objective is obtained according to the formula $D=\omega_1 \cdot W+\omega_2 \cdot TP$. A competitive relationship between a generation capacity and TP export is obtained based on a model optimization result, which is also a competitive relationship between a generation benefit and an ecological benefit. When conditions permit, in order to ensure a certain ecological benefit, the hydropower station arranges a reasonable power generation plan to increase the TP export, and performs ecological operation according to an operation rule extracted from the optimization result.

Compared with the prior art, the operation method provided by the present invention considers a phosphorus retention effect of the cascade hydropower station. In order to alleviate an eutrophication risk in a reservoir area and a lack of phosphorus downstream, the present invention makes the optimization with the goal of maximizing the TP export. The present invention alleviates an ecological and environmental problem of the cascade hydropower station from the physical and chemical characteristics of a water body. Traditional ecological optimal operation methods, such as minimum ecological flow constraint and hydrological regime indicator method, often fail to resolve the underlying causes. The present invention is inclined to improve the ecology from a water quality change mechanism, and provides perfect theoretical support.

Figure 4:
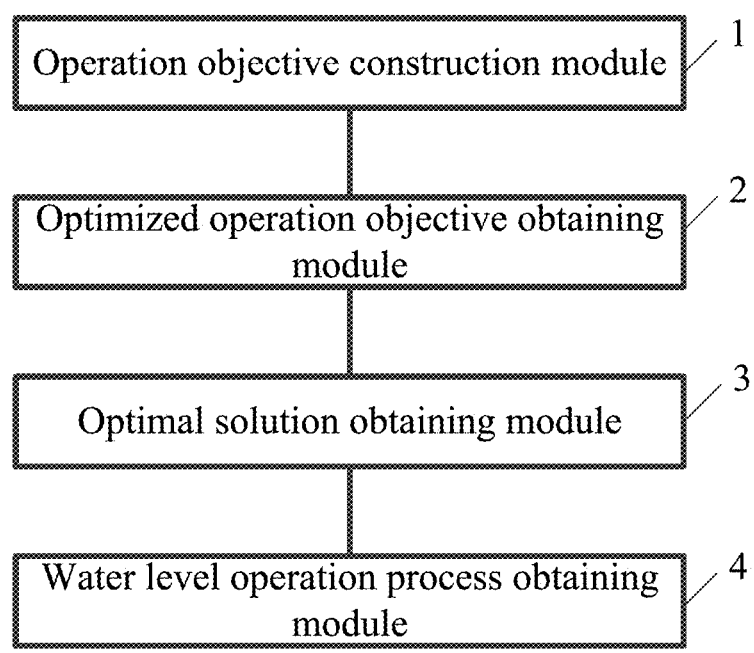
FIG. 4 is a structural diagram of a system for ecological operation of TP export of a cascade hydropower station provided by an embodiment of the present invention.

In addition, based on the above-mentioned operation method, the present invention provides a system for ecological operation of TP export of a cascade hydropower station. As shown in FIG. 4, the system includes an operation objective construction module 1, an optimized operation objective obtaining module 2, an optimal solution obtaining module 3 and a water level operation process obtaining module 4.

The operation objective construction module 1 is configured to construct an operation objective of the cascade hydropower station, the operation objective being: $D=\omega_1 \cdot W+\omega_2 \cdot TP$, where TP is a TP export of the cascade hydropower station, max $TP=\Sigma_{t=1}^{T} Q_{k,t} \cdot c_{k,t} \cdot \Delta t$; W is total power generation of the cascade hydropower station, max $W=\Sigma_{t=1}^{T} \Sigma_{j=1}^{k} P_{j,t} \cdot \Delta t$; T is a total number of time periods in an operation period; k is a serial number of a last stage of hydropower station in the cascade hydropower station; $\Delta t$ is a time step; j is a serial number of a hydropower station in the cascade hydropower station from upstream to downstream; $QR_{k,t}$ is a release flow of the hydropower station k in a time period t; $c_{k,t}$ is an average phosphorus concentration of the hydropower station k in the time period t, $$c_{k,t} = \frac{M_t + M_{t+1}}{2V_t};$$

$L_t$ is a phosphorus load in the time period t; σ is a deposition coefficient; $QR_t$ is an average release capacity in the time period t; $V_t$ is an average storage capacity of the hydropower station k in the time period t; $M_t$ is the total mass of phosphorus in a water body of a reservoir area at a time t; $P_{j,t}$ is an average output of the power station j in the time period t; t is a serial number of a time period; $\omega_1$ is a weight of the total power generation; $\omega_2$ is a weight of the TP export, $\omega_1 \in [1, 0]$, $\omega_2 \in [0, 1]$ and $\omega_1 + \omega_2 = 1$.

The optimized operation objective obtaining module 2 is configured to change the weight $\omega_2$ of the TP export and the weight $\omega_1$ of the total power generation according to a set step size, to obtain an operation objective under different weight ratios.

The optimal solution obtaining module 3 is configured to optimize the operation objective under different weight ratios by using a DPSA algorithm to obtain multiple optimal solutions.

The water level operation process obtaining module 4 is configured to obtain a water level operation process corresponding to a maximum optimal solution among the multiple optimal solutions, and use the water level operation process to operate the cascade hydropower station.

The optimal solution obtaining module 3 includes:
a water level optimization unit, configured to optimize a water level of each stage of hydropower station in the cascade hydropower station at different times by using the water level of each stage of hydropower station at different times as a decision variable;
a TP export and total power generation obtaining unit, configured to obtain TP export and total power generation corresponding to an optimized water level in different time periods, based on an optimized water level at different times; and
an optimal solution obtaining unit, configured to obtain multiple optimal solutions of the operation objective under different weight ratios according to the TP export and the total power generation corresponding to the optimized water level in different time periods.

The optimal solution obtaining module 3 further includes a constraint condition obtaining unit, configured to obtain a constraint condition for the water level to serve as a decision variable, the constraint condition including a water balance constraint, a storage capacity constraint, an output constraint and a release flow constraint.

Each embodiment of the present specification is described in a progressive manner, each embodiment focuses on the difference from other embodiments, and the same and similar parts between the embodiments may refer to each other. For a system disclosed in the embodiments, since it corresponds to the method disclosed in the embodiments, the description is relatively simple, and reference can be made to the method description.

Several examples are used herein for illustration of the principles and embodiments of the present invention. The description of the embodiments is used to help illustrate the method and its core principles of the present invention. In addition, a person of ordinary skill in the art can make various modifications in terms of specific embodiments and scope of application in accordance with the teachings of the present invention. In conclusion, the content of this specification shall not be construed as a limitation to the present invention.

What is claimed is:
1. A method for ecological operation of total phosphorus (TP) export of a cascade hydropower station, the method comprising:
constructing an operation objective of the cascade hydropower station, the operation objective being: $D = \omega_1 \cdot W + \omega_2 \cdot TP$, wherein TP is a TP export of the cascade hydropower station, max $TP = \Sigma_{t=1}^{T} QR_{k,t} \cdot c_{k,t} \cdot \Delta t$; W is total power generation of the cascade hydropower station, max $W = \Sigma_{t=1}^{T} \Sigma_{j=1}^{k} P_{j,t} \cdot \Delta t$; T is a total number of time periods in an operation period; k is a serial number of a last stage of a hydropower station in the cascade hydropower station; $\Delta t$ is a time step; j is a serial number of a hydropower station in the cascade hydropower station from upstream to downstream; $QR_{k,t}$ is a release flow of the hydropower station k in a time period t; $c_{k,t}$ is an average phosphorus concentration of the hydropower station k in the time period t,

$$c_{k,t} = \frac{M_t + M_{t+1}}{2V_t};$$

$V_t$ is an average storage capacity of the hydropower station k in the time period t; $M_t$ is the total mass of phosphorus in a water body of a reservoir area at a time t; $P_{j,t}$ is an average output of the hydropower station j in the time period t; t is a serial number of a time period; $\omega_1$ is a weight of the total power generation; $\omega_2$ is a weight of the TP export, $\omega_1 \in [1, 0]$, $\omega_2 \in [0, 1]$ and $\omega_1 + \omega_2 = 1$;
changing the weight $\omega_2$ of the TP export and the weight $\omega_1$ of the total power generation according to a set step size, to obtain an operation objective under different weight ratios;
optimizing the operation objective under different weight ratios by using a dynamic programming successive approximation (DPSA) algorithm to obtain multiple optimal solutions; and
obtaining a water level operation process corresponding to a maximum optimal solution among the multiple optimal solutions, and using the water level operation process to operate the cascade hydropower station.

2. The method for ecological operation of TP export of a cascade hydropower station according to claim 1, wherein the set step size is 0.1.

3. The method for ecological operation of TP export of a cascade hydropower station according to claim 1, wherein the optimizing the operation objective under different weight ratios by using a DPSA algorithm to obtain multiple optimal solutions comprises:
optimizing a water level of each stage of hydropower station in the cascade hydropower station at different times by using the water level of each stage of hydropower station at different times as a decision variable;
obtaining TP export and total power generation corresponding to an optimized water level in different time periods, based on an optimized water level at different times; and
obtaining multiple optimal solutions of the operation objective under different weight ratios according to the TP export and the total power generation corresponding to the optimized water level in different time periods.

4. The method for ecological operation of TP export of a cascade hydropower station according to claim 3, wherein the optimizing the operation objective under different weight ratios by using a DPSA algorithm to obtain multiple optimal solutions further comprises:

obtaining a constraint condition for the water level to serve as a decision variable, the constraint condition comprising a water balance constraint, a storage capacity constraint, an output constraint and a release flow constraint.

5. A system for ecological operation of total phosphorus (TP) export of a cascade hydropower station, comprising:

an operation objective construction module, configured to construct an operation objective of the cascade hydropower station, the operation objective being: $D=\omega_1 \cdot W + \omega_2 \cdot TP$, wherein TP is a TP export of the cascade hydropower station, max $TP=\Sigma_{t=1}^{T} Q_{k,t} \cdot c_{k,t} \cdot \Delta t$; W is total power generation of the cascade hydropower station, max $W=\Sigma_{t=1}^{T}\Sigma_{j=1}^{k} P_{j,t} \cdot \Delta t$; T is a total number of time periods in an operation period; k is a serial number of a last stage of hydropower station in the cascade hydropower station; $\Delta t$ is a time step; j is a serial number of a hydropower station in the cascade hydropower station from upstream to downstream; $QR_{k,t}$ is a release flow of the hydropower station k in a time period t; $c_{k,t}$ is an average phosphorus concentration of the hydropower station k in the time period t, $$c_{k,t} = \frac{M_t + M_{t+1}}{2V_t};$$

$V_t$ is an average storage capacity of the hydropower station k in the time period t; $M_t$ is the total mass of phosphorus in a water body of a reservoir area at a time t; $P_{j,t}$ is an average output of the power station j in the time period t; t is a serial number of a time period; $\omega_1$ is a weight of the total power generation; $\omega_2$ is a weight of the TP export, $\omega_1 \in [1, 0]$, $\omega_2 \in [0, 1]$ and $\omega_1+\omega_2=1$;

an optimized operation objective obtaining module, configured to change the weight $\omega_2$ of the TP export and the weight $\omega_1$ of the total power generation according to a set step size, to obtain an operation objective under different weight ratios;

an optimal solution obtaining module, configured to optimize the operation objective under different weight ratios by using a DPSA algorithm to obtain multiple optimal solutions; and a water level operation process obtaining module, configured to obtain a water level operation process corresponding to a maximum optimal solution among the multiple optimal solutions, and use the water level operation process to operate the cascade hydropower station.

6. The system for ecological operation of TP export of a cascade hydropower station according to claim 5, wherein the optimal solution obtaining module comprises:

a water level optimization unit, configured to optimize a water level of each stage of hydropower station in the cascade hydropower station at different times by using the water level of each stage of hydropower station at different times as a decision variable;

a TP export and total power generation obtaining unit, configured to obtain TP export and total power generation corresponding to an optimized water level in different time periods, based on an optimized water level at different times; and an optimal solution obtaining unit, configured to obtain multiple optimal solutions of the operation objective under different weight ratios according to the TP export and the total power generation corresponding to the optimized water level in different time periods.

7. The system for ecological operation of TP export of a cascade hydropower station according to claim 6, wherein the optimal solution obtaining module further comprises:

a constraint condition obtaining unit, configured to obtain a constraint condition for the water level to serve as a decision variable, the constraint condition comprising a water balance constraint, a storage capacity constraint, an output constraint and a release flow constraint.

* * * * *

UNITED STATES PATENT AND TRADEMARK OFFICE
CERTIFICATE OF CORRECTION

| | | |
|---|---|---|
| PATENT NO. | : 11,295,245 B2 | Page 1 of 1 |
| APPLICATION NO. | : 16/860443 | |
| DATED | : April 5, 2022 | |
| INVENTOR(S) | : Yu Li et al. | |

It is certified that error appears in the above-identified patent and that said Letters Patent is hereby corrected as shown below:

On the Title Page

Item [30], insert:
-- Foreign Application Priority Data
Dec. 26, 2019 (CN) ............. 201911365764.X --

Signed and Sealed this
Twenty-fifth Day of October, 2022

Katherine Kelly Vidal
*Director of the United States Patent and Trademark Office*